(12) United States Patent
Weder

(10) Patent No.: US 6,460,316 B1
(45) Date of Patent: *Oct. 8, 2002

(54) MODIFIED ATMOSPHERE PACKAGING FOR A FLORAL GROUPING

(75) Inventor: Donald E. Weder, Highland, IL (US)

(73) Assignee: Southpac Trust International, Inc., Raratonga Cook Island (*) Notice: Subject to any disclaimer, the term of this patent is extended or adjusted under 35 U.S.C. 154(b) by 0 days.

This patent is subject to a terminal disclaimer.

(21) Appl. No.: 09/908,535

(22) Filed: Jul. 18, 2001

Related U.S. Application Data

(63) Continuation of application No. 09/366,507, filed on Aug. 3, 1999, now Pat. No. 6,357,207.

(51) Int. Cl.[7] .......................... B65B 25/02; B65B 31/00
(52) U.S. Cl. ..................... 53/412; 53/432; 53/445
(58) Field of Search .................. 53/400, 432, 434, 53/412, 445; 206/423; 422/40; 47/84

(56) References Cited

U.S. PATENT DOCUMENTS

| | | |
|---|---|---|
| 2,774,187 A | 12/1956 | Smithers |
| 3,320,697 A | 5/1967 | Larsen |
| 3,657,840 A | 4/1972 | Benoist |
| 4,006,561 A | 2/1977 | Thoma et al. |
| 4,034,508 A | 7/1977 | Dedolph |
| 4,118,890 A | 10/1978 | Shore |
| 4,189,868 A | 2/1980 | Tymchuck et al. |
| 4,209,538 A | 6/1980 | Woodruff |
| 4,224,347 A | 9/1980 | Woodruff |
| 4,400,910 A | 8/1983 | Koudstaal et al. |
| 4,411,921 A | 10/1983 | Woodruff |
| 4,522,835 A | 6/1985 | Woodruff et al. |
| 4,987,745 A | 1/1991 | Harris |
| 4,996,071 A | 2/1991 | Bell |
| 5,046,302 A | 9/1991 | Bolejack et al. |
| 5,111,639 A | 5/1992 | Bolejack et al. |
| 5,560,181 A | 10/1996 | Weder |
| 5,560,947 A | 10/1996 | Bell |
| 5,743,398 A | 4/1998 | Weder |

FOREIGN PATENT DOCUMENTS

| | | |
|---|---|---|
| DE | 2948265 | 5/1981 |
| EP | 0414451 | 2/1991 |
| EP | 0289291 | 10/1993 |

OTHER PUBLICATIONS

Thornton, N.C. 1930. The Use of Carbon Dioxide for Prolonging The Life of Cut Flowers, with Special Reference to Roses. *Amer. J. Bot* 17:614–626.

Thornton, N.C. 1930. Carbon Dioxide Storage of Fruits, Vegetables, and Flowers. *Inducstrial and Engineering Chemistry* 22:1186–1189.

(List continued on next page.)

*Primary Examiner*—Stephen F. Gerrity
(74) *Attorney, Agent, or Firm*—Dunlap, Codding & Rogers, P.C.

(57) ABSTRACT

Methods are provided for packaging floral groupings in a modified atmosphere at or near the site or harvest. The modified atmosphere package, which generally contain oxygen and carbon dioxide concentrations which differ from those seen in air, is constructed of a material which has modified atmosphere characteristics such that the material is permeable to certain gases while impermeable to others. The package may also include fluid impermeable perforations to assist in the removal of the floral grouping from the package. A surface packaging agent, which maintains the appearance of the floral grouping and/or the modified atmosphere package, may also be present on the package, and a floral grouping maintenance agent, which maintains the appearance of the floral grouping, may also be disposed within the package with the floral grouping before partially sealing the modified atmosphere package about the floral grouping.

97 Claims, 2 Drawing Sheets

OTHER PUBLICATIONS

Hawes, J.E. and C.B. Link. 1951. Physiological Studies of Prepackaged Cut Flowers. *American Society for Horticultural Science* 57:423–431.

Anon. 1958. No–Ice Film Holds flowers in Own Humidity. *Modern Packaging* 31 (5): 103.

Parsons, C.S., S. Asen and N.W. Stuart 1967. Controlled–Atmosphere Storage of Daffodil Flowers. *Proc. Amer. Soc. Hort. Sci.* 90:506–514.

Rogers, M.N. 1973. An Historical and Critical Review of Post–Harvest Physiology Research on Cut Flowers. *Hortscience* 8:189–194.

Harbaugh, G.J., Wilfret, A.W., Engelhard, W.E., Waters,and F.J. Marousky. 1976. Evaluation of 40 Ornamental Plants for A Mass Marketing System Utilizing Sealed Polyethylene. *Proc. Fla. State Hort. Soc.* 89:320–323.

Anon. 1980. Controlling the Atmosphere with Bag–In–Box Packaging. *Package Engineering* 25(1):33–36.

Prince, T.A., R.C. Herner, and A.A. DeHertogh. 1981. Low Oxygen Storage of Special Precooled 'Kees Nelis' and 'Prominence' Tulip Bulbs. *J. Amer. Soc. Hort. Sci.* 106(6): 747–751.

Akamine, E. K. and T. Goo. 1981. Effects of Static Controlled Atmosphere and Reduced Pressure Storage on Fading of Vanda Miss Joaquim Flowers. *Univ. of HI, College of Trop. Agr. and Human Resources* 008:1–8.

Akamine, E. K. and T. Goo. 1981. Controlled Atmosphere Storage of Anthurium Flowers. *Hortscience* 16(2):206–207.

Staby, G.L., J.W. Kelly and M.S. Cunningham. 1982. Floral Crop Storage. *Controlled Atmospheres for Storage and Transportation of Perishable Agricultural Commodities* Richardson, D.G. and M. Meheriuk, Eds. Oregon State Univ. 239–266.

Prince, T.A., R.C. Herner and S.W. Gyeszly. 1982. Storage of Special Precooled Tulip Bulbs in Controlled Atmosphere Packages. *Controlled Atmospheres for Storage and Transport of Perishable Agricultrual Commodities* Richardson, D.G., G.M. Meheriuk, EDS. p77–85.

Prince, T.A. and R.C. Herner. 1983. Use of Low Density Polyethylene Film for Packaging Special Precooled Tulips (Abst.) *Hortscience* 18(4):614.

Marousky, F.S., R.H. Cubbedge and R.O. Magie. 1983. Controlled Atmospheres During Corp Storage of Flowering Gladiolu. *Florists' Review* 172(4458):38–40.

Kader, A.A., K.F. Kosmire, F.G. Mitchell, M.S. Reid, N.F. Sommer and J.F. Thompson. 1985 Postharvest Technology of Horticultural Crops. *Coop. Ext. Univ. of California Div. of Agriculture and Natural Resources*. 192pp. 58–64, 174–178.

Prince, T.A., R.C. Herner and J. Lee. 1986. Bulb Organ Changes and Influences of Termperature on Gaseous Levels in a Modified Atmosphere Package of Precooled Tulip Bulbs. *J. Amer. Soc. Hort. Sci.* 111(6):900–904.

Hardenburg, R.E., A.E. Watada and C.Y. Wang. 1986. The Commercial Storage of Fruits, Vegetables and Florist, and Nursery Stocks. *Agriculture Handbook 66* 130pp.

McGregor, B.M. 1987. Tropical Products Transport Handbook. *USDA Agr. Handbook* 668:148pp.

Goszczynska, R.M. Rudnicki. Research Institute of Pomology and Floriculture. *Horticultural Reviews* 1988 (10):35–62.

Tjosvold, S.A. and A.D. Ali. 1989. Fumigation of Western Flower Thrips using Banana Bags (Polyethylene–D) During Simulated Shipment of Cut Flowers. *Flower & Nursery Report* Summer 1989:3, 4.

Nowak, J., R.M. Rudnicki and A.A. Duncan. 1990. Postharvest Handling and Storage of Cut Flowers, Florist Greens, and Potted Plants. *Timber Press Portland, OR* 210pp.

Hammer, P.E., S.f. Yang, M.S. Reid, and J.J. Marois. 1990. Postharvest Control of Botrytis Cinerea Infections on Cut Roses Using Fungistatic Storage Atmospheres. *Journal of the American Society For Horticultural Science* 115(1):102–107.

Ricci, M.J., N.K. Lownds, and R.D. Berghage. 1991. Postharvest Longevity of Baileya Multiradiata and Aster Bigelovii. *Hortscience* 26(6):699. (Abst.).

Prince, T.A. and M.S. Cunningham, 1991. Forcing Characteristics of Easter Lily Bulbs Exposed to Elevated–Ethylene and Carbon Dioxide and Low–Oxygen Atmospheres. *Journal of the American Society for Horticultural Science* 116(1):63–67.

Vergano, P.J. and A.J. Pertuit. 1993. Effects of Modified Atmosphere Packaging on the Longevity of Phalaenopsis Florets. *Horttechnology* 3(4):423–427.

Anon. 1993. No Need for Water, Refrigeration in Displays. *Greenhouse Manager* 12(4):14.

Polking, G.F., R.J. Gladon and D.S. Koranski. 1994. Temporary Suppression of Radicle Elongation of Germinated Impatiens Seeds by Low Oxygen Concentrations. *Hortscience* 29(9):1031–1033.

Reid, M.S. and R.Y. Evans. 1994. Pstharvest Care and Handling of Specialty flowers. –Proceedings of the Seventh National Conference on Specialty Cut Flowers* Nov/94:105–113.

Cantwell, M. & B. Mitcham. 1995. Controlled Atmosphere For Insect Disinfestation. *Perishables Handling Newsletter* Issue No. 82:9–12, 29–30.

Stephens, D. 1995. Packaging Technology Transfer. *Greenhouse Grower* 13(8):120–122.

Inamoto, K., S. Sakoda, M. Doi and H. Imanishi. 1997. MA Storage May Reduce Chilling sensitiviy of Tulip Bulbs. *CA 97 Proceedings vol. 4: Vegetables and Ornamentals* Postharvest Horticulture Series No. 18:119–126. (Report on p. 13).

Reid, M.S. and L. Dodge. 1997. Produce Facts. *Perishables Handling Quarterly* Issue 14. 92:13–22.

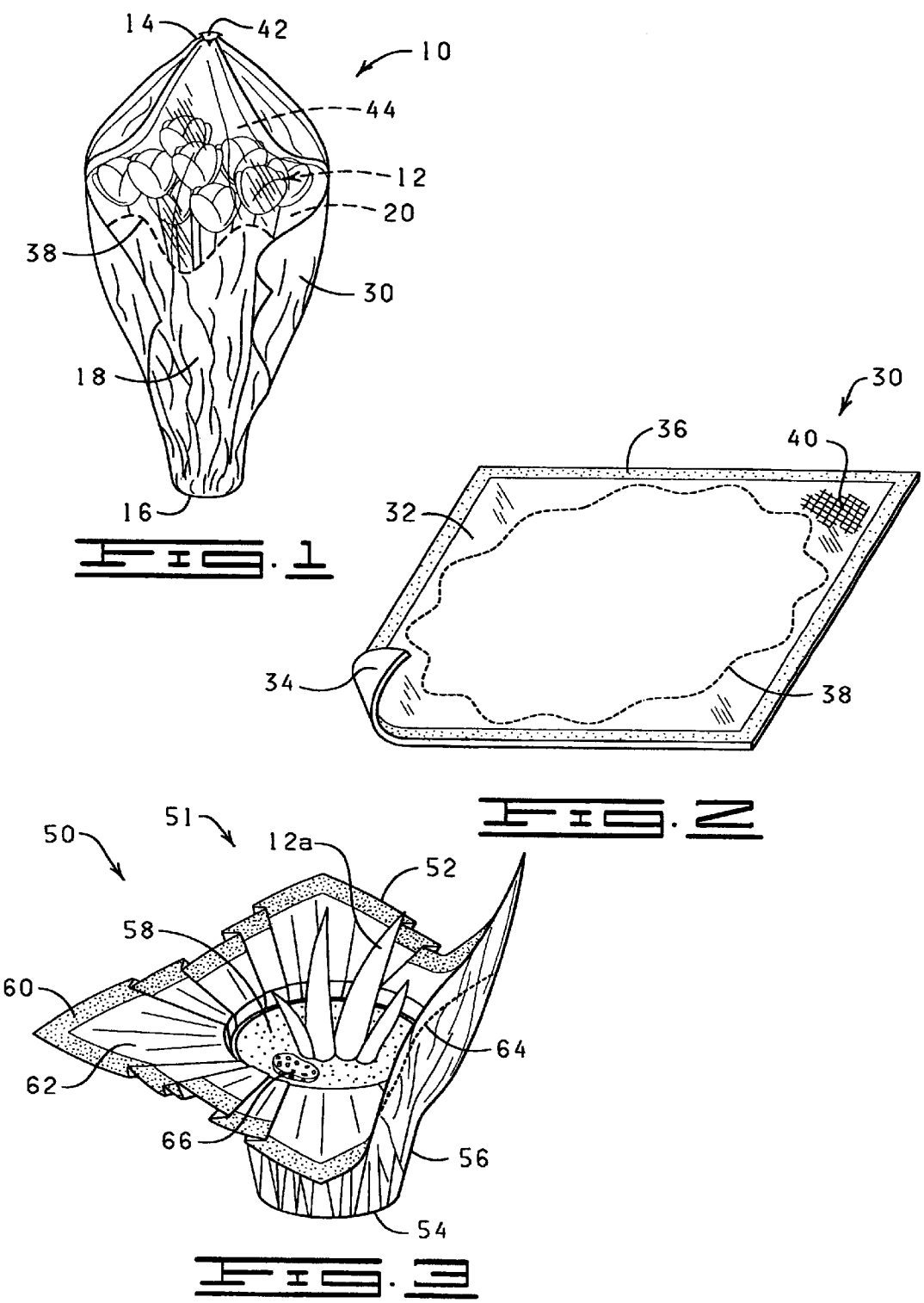

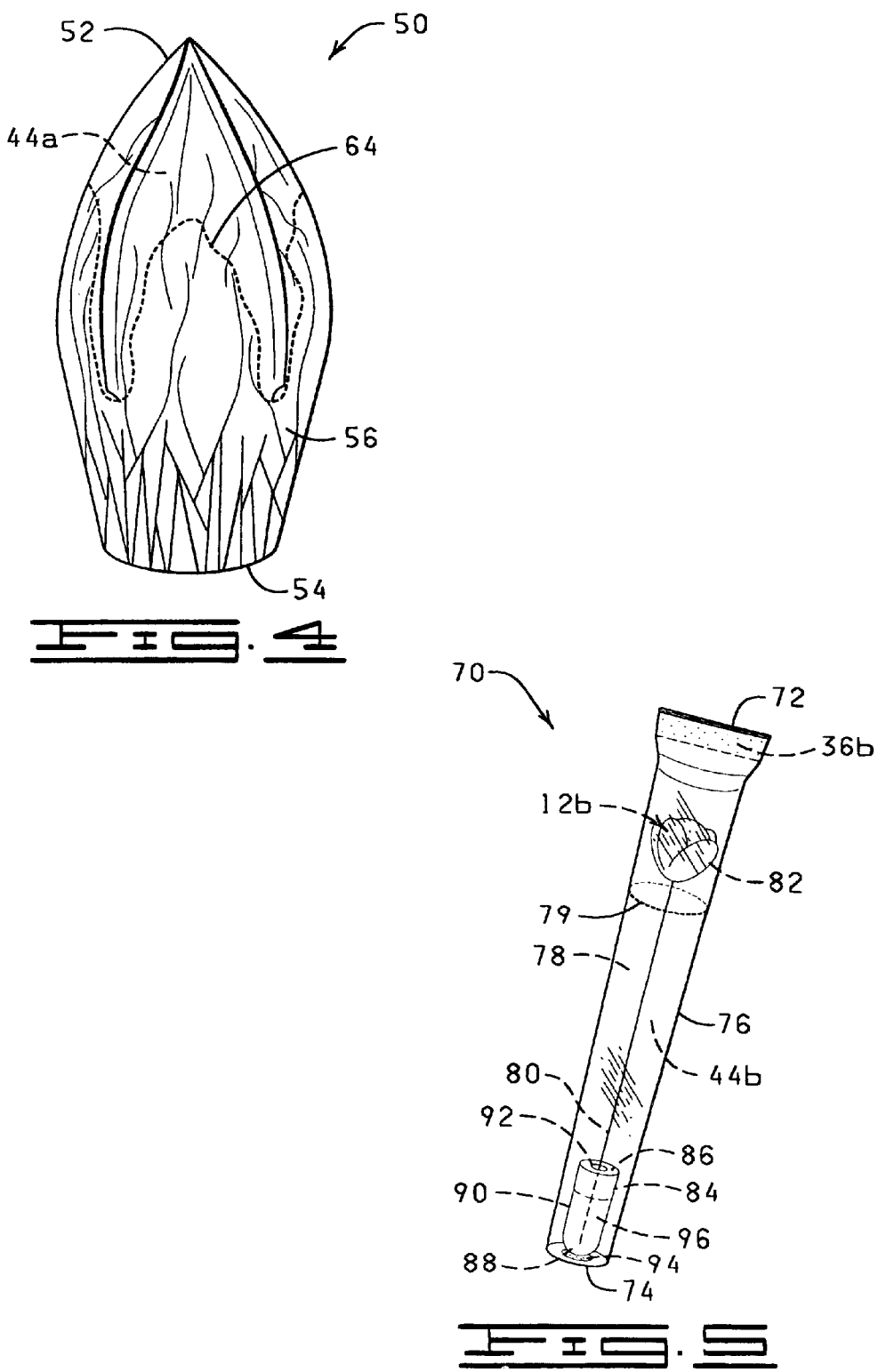

MODIFIED ATMOSPHERE PACKAGING FOR A FLORAL GROUPING

CROSS REFERENCE TO RELATED APPLICATIONS

This application is a Continuation of U.S. Ser. No. 09/366,507, entitled MODIFIED ATMOSPHERE PACKAGING FOR A FLORAL GROUPING, filed Aug. 3, 1999 now U.S. Pat. No. 6,357,207.

STATEMENT REGARDING FEDERALLY SPONSORED RESEARCH OR DEVELOPMENT

Not Applicable.

BACKGROUND OF THE INVENTION

1. Field of the Invention

The present invention relates generally to methods for packaging floral groupings, and more particularly, but not by way of limitation, to methods for packaging floral groupings in modified atmospheres.

2. Brief Description of the Art

Methods of packaging fruits and vegetables in controlled or modified atmospheres have been used commercially for many years. Controlled or modified atmospheres contain modified concentrations of oxygen and carbon dioxide, and have been shown to be more beneficial than similar storage of the produce in air. The same principle of altering the atmosphere in a storage container with respect to oxygen ($O_2$) and carbon dioxide ($CO_2$) levels is used in both controlled atmosphere storage and modified atmosphere storage. The two differ in that controlled atmosphere storage involves continuous monitoring and controlling of the levels of the two gases, while modified atmosphere storage does not involve control of the gas concentrations after initial packaging of the storage item.

Benefits of controlled atmosphere/modified atmosphere storage include slow ripening of fruits, retardation of the spread of diseases, inhibition of toughening and undesirable yellowing, etc. Many fruits have been commercially stored in controlled or modified atmospheres and include apples, cherries, strawberries, figs, kiwi fruit, nectarines, peaches, pears, avocados, and bananas. Many vegetables have been commercially stored in controlled or modified atmospheres and include tomatoes, asparagus, beets, broccoli, lettuce, potatoes, cabbage, cantaloupes, carrots, celery, corn, mushrooms, onions, and bell peppers.

Although controlled atmosphere/modified atmosphere storage of produce has been successful, considerable experimentation with controlled atmosphere/modified atmosphere storage of cut flowers and potted plants has led many in the floral industry to conclude that widespread use of these techniques in the floral industry is unfeasible. The range of optimal concentrations of $O_2$ and $CO_2$ are very narrow for most cultivars, and any imprecision results in various injuries to cut flowers and potted plants, as well as decreased vase life and increased flower senescence. Also, the optimal concentrations of $O_2$ and $CO_2$ differ not only for various species but even for various cultivars, and these differences can be quite large. In addition, when considering potted plants, the optimal $O_2$ and $CO_2$ concentrations required for one part of a plant may differ from the concentrations required for another part of the plant.

Transport of flowers and potted plants maintained in controlled/modified atmosphere storage also presents several problems, including handling flowers differently in the same cold chamber as well as the removal of certain flowers from the chamber for delivery while maintaining the modified environment surrounding the remaining flowers. Most trailers make multiple stops as wholesalers prefer to receive small quantities several times a week. In addition, potted plants are more sensitive to ethylene, which causes various injuries to plants and flowers and is produced by flowers in small amounts. Additionally, cold storage at precise temperatures is generally also required in addition to controlled atmosphere/modified atmosphere storage, and boxes and pallet bags restrict air flow, resulting in inefficient and heterogeneous cooling of the flowers; unstable or increased storage temperatures have the same effects as imprecise $O_2$ and $CO_2$ concentrations. Because of the high cost and difficulties associated with implementing controlled or modified atmosphere storage of flowers, controlled or modified atmosphere storage has been considered economically unfeasible by the floral industry.

Therefore, economically feasible methods of packaging floral groupings, including cut flowers and potted plants, in atmospheres which will increase the life of the floral grouping over that seen by storage in air are being sought. It is to such methods for packaging a floral grouping in a modified atmosphere that the present invention is directed.

SUMMARY OF THE INVENTION

According to the present invention, methods for packaging floral groupings in a modified atmosphere are provided which avoid the disadvantages and defects in the prior art, making the methods economically feasible. Broadly, methods are provided for packaging floral groupings in a modified atmosphere at or near the site or harvest. This package will be of the size and appearance which can be displayed by a retail florist and will not be opened until ready for sale, which will allow for less handling of the floral groupings at wholesale and distribution points and may even allow bypassing of these points for direct delivery to retail outlets. The packaging used may be altered to provide a decorative appearance, or may be designed for utility, such as providing price, UPC, or car handling tags or permanent holding material for the floral groupings. By packaging floral groupings singularly or in small groups, different modified atmospheres with specific $O_2$ and $CO_2$ concentrations can be used, and more efficient cooling of the floral grouping will be observed. This will allow for less handling of the floral groupings at wholesale and distribution points and would even allow bypassing of these points for direct delivery to retail outlets, making the modified atmosphere storage more successful and economically feasible.

The package is constructed of a material which has modified atmosphere characteristics such that the material is permeable to certain gases while impermeable to others. The package includes an open first end and a bonding material present on a portion thereof. The package may also include fluid impermeable perforations to assist in the removal of the floral grouping from the package. A surface packaging agent, which maintains the appearance of the floral grouping and/or the modified atmosphere package, may also be present on the package.

In preparing a floral grouping for shipment utilizing the modified atmosphere package, a floral grouping is disposed within the package. A floral grouping maintenance agent, which maintains the appearance of the floral grouping, may also be disposed within the package with the floral grouping before partially sealing the modified atmosphere package about the floral grouping.

A modified atmosphere is then injected into the package, and the first end of the package which is partially open is sealed to provide a modified atmosphere package for a floral grouping. The modified atmospheres generally contain $O_2$ and $CO_2$ concentrations which differ from those seen in air.

An object of the present invention is to provide a modified atmosphere for storage of floral groupings.

Another object of the present invention, while achieving the before-stated object, is to provide methods for producing a modified atmosphere for storage of floral groupings.

Other objects, features and advantages of the present invention will become apparent from the following detailed description when read in conjunction with the accompanying drawings and appended claims.

BRIEF DESCRIPTION OF THE DRAWINGS

FIG. 1 is a perspective view illustrating a modified atmosphere package disposed about a floral grouping in accordance with the present invention.

FIG. 2 is a perspective view illustrating a sheet of material from which the modified atmosphere package of FIG. 1 is constructed.

FIG. 3 is a perspective view illustrating a potted plant disposed in an unsealed modified atmosphere package constructed in accordance with the present invention.

FIG. 4 is a perspective view illustrating a flower pot encapsulated in the modified atmosphere package of FIG. 3.

FIG. 5 is a perspective view illustrating the modified atmosphere package disposed about a cut flower wherein the cut flower has a stem portion, a portion of which is disposed in a vial containing a floral preservative solution.

DETAILED DESCRIPTION OF THE INVENTION

Referring now to the drawings, shown in FIG. 1 and designated therein by the general reference numeral 10 is a package for providing a modified atmosphere package for a floral grouping 12 constructed in accordance with the present invention. The modified atmosphere package 10 has an open first end 14, a closed second end 16, and a sidewall 18. The closed second end 16 and the sidewall 18 of the modified atmosphere package 10 cooperate to define a floral grouping retaining space 20 which openly communicates with the open first end 14 of the modified atmosphere package 10.

The modified atmosphere package 10 is constructed of a sheet of material 30, which is shown in FIG. 2. The sheet of material 30 is characterized as having an inner surface 32, an outer surface 34, and modified atmosphere characteristics such that the sheet of material 30 is permeable to certain gases while impermeable to other gases. The sheet of material 30 from which the modified atmosphere package 10 is constructed is provided with a bonding material 36 disposed upon the sheet of material 30 for reasons which will be defined in detail hereinafter. Also, the sheet of material 30 may have fluid impermeable perforations 38 present on a portion thereof.

The thickness of the sheet of material 30 can vary widely as long as the sheet of material 30 is flexible and possesses the modified atmosphere characteristics defined hereinafter. Generally, however, the sheet of material 30 has a thickness in a range from about 0.1 mil to about 10 mils. Frequently, the sheet of material 30 has a thickness in a range from about 0.2 mil to about 3.5 mils. The sheet of material 30 is constructed of a material which is flexible.

The sheet of material 30 may be any shape, and a rectangular shape is shown in FIG. 2 only by way of example. The sheet of material 30, for example only, may be square, rectangular, circular or any other geometric, non-geometric, asymmetric or fanciful shape, such as, but not by way of limitation, heart shaped.

The sheet of material 30 is a plastic material constructed from a plastic film having modified atmosphere characteristics, that is, a film which is permeable to some substances and/or gases, but impermeable to others. The sheet of material 30 will be substantially impermeable to water vapor, microbial contaminants and liquid. In this way, modified atmosphere packaging keeps the moisture content constant throughout the storage period. The sheet of material may have varying permeabilities to oxygen and carbon dioxide. Partial permeability counteracts the effects of respiration by the floral grouping 12; that is, respiration of the floral grouping 12 maintained in a package which is impermeable to oxygen or carbon dioxide will result in large accumulations of carbon dioxide and depletion of oxygen, both of which can have adverse effects on the floral grouping 12. Therefore, the modified atmosphere package 10 constructed from the sheet of material 30 will have partial permeabilities to oxygen and carbon dioxide, thereby containing the oxygen and carbon dioxide concentrations of the modified atmosphere injected into the package 10 while controlling the accumulation of carbon dioxide and the depletion of oxygen resulting from respiration of the floral grouping 12.

Controlled or modified atmosphere film and methods of making said films are known in the art. Such a plastic film is available from Hercules, Incorporated, Hercules Plaza, Wilmington, Del. 19894. Other examples of such a film include, for example, but not by way of limitation, Polyethylene-D, See-Pak®, Fresh-Hold®, Star*Pac®, Cryovac®, mylar, cellophane, high density polyethylene, low density polyethylene, polypropylene, polyvinyl chloride, and pliofilm. Different plastic films, or combination of films, may be utilized according to the contents of the package and the modified atmosphere desired within such packages, as described in detail below, as well as the oxygen and carbon dioxide permeabilities required to maintain the modified atmosphere. The permeabilities of several films are given hereinafter for example only, and not by way of limitation: mylar film is relatively impermeable to both oxygen and carbon dioxide gases, having permeabilities of about 80 $cc/m^2/atm/day$ for oxygen and about 218 $cc/m^2/atm/day$ for carbon dioxide at 20° C., 0% relative humidity, and 0.5 mils thickness; low density polypropylene is slightly more permeable, having permeabilities in the range of from about 2,200 to about 3,700 $cc/m^2/atm/day$ for oxygen and from about 3,400 to about 13,000 $cc/m^2/atm/day$ for carbon dioxide at 20° C., 0% relative humidity and a thickness in the range of from about 2.0 mils to about 6.0 mils; and pliofilm being substantially more permeable, having permeabilities of about 28,000 $cc/m^2/atm/day$ for oxygen and about 101,700 $cc/m^2/atm/day$ for carbon dioxide at 20° C., 0% relative humidity, and 1.0 mils thickness.

It should also be noted that the thickness of the film is inversely proportional to the permeability of the film; for example, but not by way of limitation, low density polypropylene having a thickness of 2.0 mils has permeabilities of about 3,700 $cc/m^2/atm/day$ and about 13,000 $cc/m^2/atm/day$ for oxygen and carbon dioxide, respectively, while low density polypropylene having a thickness of 6.0 mils has permeabilities of about 2,200 $cc/m^2/atm/day$ and about 3,400 $cc/m^2/atm/day$ for oxygen and carbon dioxide, respectively.

It will be understood that modified atmosphere packages constructed of sheets of material with differing permeabilities may be employed in the spirit of the invention.

The sheet of material 30 may be constructed of a single layer of material or a plurality of layers of the same or different types of materials. The layers of material comprising the sheet of material 30 may be laminated together or connected together by any method described herein or known in the art. A multilayered sheet of material 30 must still retain flexibility and the previously defined modified atmosphere characteristics.

A bonding material 36 may be disposed substantially over the inner surface 32 of the sheet of material 30. The bonding material 36 may also be disposed upon the inner surface 32 of the sheet of material 30 in a strip of bonding material 36. The bonding material 36 must be applied over a substantial length of distance so as to effect an air tight seal upon bondingly connecting the first end 14 of the modified atmosphere package 10.

One method for disposing a bonding material, in this case an adhesive, on a sheet of material is described in U.S. Pat. No. 5,111,637, entitled, "Method For Wrapping A Floral Grouping", issued to Weder et al. on May 12, 1992 and which is hereby incorporated herein by reference. Another method for disposing a bonding material in order to laminate two sheets of material is described in U.S. Pat. No. 4,297,811, entitled, "Laminated Printed Foil Flower Pot Wrap With Multicolor Appearance", issued to Weder on Nov. 3, 1981 and which is hereby incorporated herein by reference.

The term "bonding material" when used herein means an adhesive, possibly a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" when used herein also means a lacquer, which may be applied to the sheet of material and, in this instance, heat, sound waves, or vibrations, also must be applied to effect the sealing of the lacquer.

It will be understood that although this embodiment includes the use of a bonding material 36 to seal the modified atmosphere package 10, other methods of sealing the first end 14 of the modified atmosphere package 10 to provide an air-tight seal may be used. Examples of alternative sealing methods include, but not by way of limitation, a band, a plug, and a clip.

It will be appreciated that the sheet of material 30 may consist of designs or decorative patterns which are printed, etched, and/or embossed thereon using inks or other printing materials. Each of the above named patterns may occur alone or in combination. When two or more patterns are present, the patterns may be in register with one another, out of register with one another, or partially in register and partially out of register with one another. Examples of printed designs other than decorative designs include, for example, but not by way of limitation, UPC tags, price tags, care and handling tags, and company or brand logos. An example of an ink which may be applied to one or more surfaces of the sheet of material 30 is described in U.S. Pat. No. 5,147,706, entitled, "Water Based Ink On Foil And/Or Synthetic Organic Polymer", issued to Kingman on Sep. 15, 1991 and which is hereby incorporated herein by reference.

The sheet of material 30 may have various colorings, coatings, embossings, flocking and/or metallic finishes, or other decorative surface ornamentation applied separately or simultaneously, or may be characterized totally or partially by pearlescent, translucent, transparent, iridescent or the like qualities. Each of the above-named characteristics may occur alone or in combination and may be applied to the inner surface 32 and/or the outer surface 34 of the sheet of material 30. Moreover, each surface of the sheet of material 30 may vary in the combination of such characteristics. The sheet of material 30 may be opaque, translucent, clear, tinted, transparent or any combination thereof.

The bonding material 36 may also be used to laminate two sheets of material 30 together and may also be tinted or colored using a dye, pigment, or ink. In this manner, different coloring effects are provided, and the multiple sheets of material 30 may be given a colored appearance by use of a colored bonding material 36. U.S. Pat. No. 5,147,706 described immediately above provides one water based ink which may be used to tint one or more sheets of material 30 or which may be used to tint the bonding material 36.

Referring again to FIG. 2, one or more surface packaging agents 40 may be present on the sheet of material 30. The surface packaging agent 40 maintains the appearance of the floral grouping and the modified atmosphere package until ready for sale by methods such as, but not by way of limitation, preventing disease, wilting and senescence of flowers and preventing fogging and moisture buildup on the packaging. The surface packaging agent 40 may be a disinfectant, a desiccant, an anti-fogging agent, an anti-ethylene agent, a cooling enzyme and combinations thereof.

The sheet of material 30 may have a disinfectant as a surface packaging agent 40 disposed thereon and/or incorporated therein. The term "disinfectant" as used herein means an agent possessing antifungal properties, antibacterial (bacteriostatic or bactericidal) properties, insecticidal properties, and/or antimicrobial properties. Examples of disinfectants include, but not by way of limitation, 8-hydroxyquinoline sulfate, 8-hydroxyquinoline citrate, iprodione, procymidone, vinclozolin, VANGUARD® (Ciba-Geigy), prochloraz, PHYSAN®-20, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

It will also be understood that many disinfectants are known in the art. It will further be appreciated that the precise combinations and amounts of disinfectants used is dependent upon the results sought and the items to be packaged. The duration of action of the disinfectant(s) will depend, in part, upon the disinfectant(s) used, the concentration of the disinfectant(s) used, and the exposure of the disinfectant(s) to atmospheric and/or packaged conditions.

The sheet of material 30 may have a desiccant as a surface packaging agent 40 disposed thereon and/or incorporated therein. Such desiccants include, for example, but not by way of limitation, calcium chloride and silica gel. It will be understood that a number of desiccants are known to those having ordinary skill in the art, and it will be appreciated that the precise amount of desiccant(s) disposed on or incorporated in the sheet of material 30 is dependent upon the results sought and the items to be packaged therein. The duration of action of the desiccant will depend, in part, upon the desiccant(s) used, the concentration of the desiccant(s) used, and the exposure of the desiccant(s) to atmospheric and/or packaged conditions.

The sheet of material 30 may have an anti-fogging agent as a surface packaging agent 40 disposed thereon and/or incorporated therein. It will be appreciated that anti-fogging agents are known in the art. It will further be appreciated that the precise amounts of anti-fogging agents used is dependent upon the results sought and the items to be packaged. The duration of action of the agent(s) will depend, in part, upon the agent(s) used, the concentration of the agent(s) used, and the exposure of the agent(s) to atmospheric and/or packaged conditions.

The desiccant and anti-fogging agent are disposed upon the sheet of material 30 as a surface packaging agent 40 and not disposed in the modified atmosphere package 10 with the floral grouping 12 as a floral grouping maintenance agent (described in detail hereinafter) because only moisture from the inner surface 32 of the sheet of material 30 need be removed, and contact between the desiccant or anti-fogging agent and the floral grouping 12 may decrease the water concentration of the floral grouping 12, causing the floral grouping 12 to wilt.

The sheet of material 30 may have an anti-ethylene agent as a surface packaging agent 40 disposed thereon and/or incorporated therein. The most adverse and injurious effects on cut flowers and potted plants are caused by ethylene, which is produced in elevated levels by diseased, injured and senescing flowers and floral groupings. Examples of anti-ethylene agents include agents which remove ethylene from the atmosphere as well as agents which inhibit ethylene production or counteract the effects of ethylene. Anti-ethylene agents which remove ethylene from the atmosphere include, but not by way of limitation, potassium permanganate-containing ethylene scrubbers and activated brominated charcoal. Potassium permanganate-containing ethylene scrubbers contain potassium permanganate adsorbed on carriers with large porous surfaces, such as, but not by way of limitation, alumina pellets, Celite, expanded glass, perlite, silica gel, and vermiculite. Anti-ethylene agents which inhibit ethylene production or counteract the effects of ethylene include, but not by way of limitation, ethylene oxide, aminoethoxyvinylglycine, sodium thiosulfate, sodium benzoate, carbonyl cyanide, cycloheximide, 1-methylcyclopropene, substituted benzothiadiazole, gibberellins, and cytokinins.

It will be appreciated that the precise amounts of anti-ethylene agents used is dependent upon the results sought and the items to be packaged. The duration of action of the agent will depend, in part, upon the agent(s) used, the concentration of the agent(s) used, and the exposure of the agent(s) to atmospheric and/or packaged conditions.

The sheet of material 30 may have a cooling enzyme as a surface packaging agent 40 disposed thereon and/or incorporated therein. It will be appreciated that cooling enzymes, which reduce the ambient temperature, are known in the art. It will further be appreciated that the precise amounts of cooling enzymes used is dependent upon the results sought and the items to be packaged. The duration of action of the enzyme will depend, in part, upon the enzyme(s) used, the concentration of the enzyme(s) used, and the exposure of the enzyme(s) to atmospheric and/or packaged conditions.

Any of the surface packaging agents 40 may be disposed upon the sheet of material 30 by any method known in the art, including, but not by way of limitation, spraying, brushing, immersing the sheet of material 30 in a surface packaging agent 40, and exposure of the sheet of material 30 to surface packaging agent-containing gas, or mixing and/or incorporating the surface packaging agent 40 in a dye, pigment, ink, lacquer, or any combination thereof, or any other medium, which is then applied to the sheet of material 30. Further, it will be understood that the bonding material 36 and any of the surface packaging agents 40 may be disposed upon or incorporated in any item such as, but not by way of limitation, tape, labels, stickers, decals, and the like, and then applied to the sheet of material 30. It will be appreciated that the entire sheet of material 30 may be treated in the manner described above, or, alternatively, only a portion thereof may be treated. The surface packaging agents 40 may also be incorporated into the sheet of material 30 before or during formation of the sheet of material 30.

The surface packaging agents 40 may also be mixed with or incorporated in the bonding material 36, the bonding material 36 then being disposed upon at least a portion of the sheet of material 30. Methods for such mixing and/or incorporation are known in the art, as are methods for disposing bonding material on sheet material. The surface packaging agents 40 may also be mixed with or incorporated into a lacquer, the lacquer then being disposed upon at least a portion of the sheet of material 30.

The surface packaging agents 40, as well as the bonding material 36, may alternatively be disposed upon the sheet of material 30 via microcapsules. Suitable microcapsules and methods which may be utilized with the above-referenced surface packaging agents 40 and bonding material 36 are known in the art.

Referring now to FIGS. 1 and 2, the sheet of material 30 is gathered around a floral grouping 12 to provide the floral grouping retaining space 20 such that the floral grouping 12 is disposed in the floral grouping retaining space 20 of the package 10. The open first end 14 of the modified atmosphere package 10 is partially sealed via the bonding material 36 disposed on the sheet of material 30 to provide a small opening 42 in the first end 14 of the modified atmosphere package 10. Through the opening 42, a modified atmosphere 44 is injected into the floral grouping retaining space 20 of the modified atmosphere package 10. The modified atmosphere 44 contains an oxygen concentration ranging from 0% to about 21% by volume, a carbon dioxide concentration ranging from 0% to about 30% by volume, and the remaining concentration of the modified atmosphere 44 being substantially all molecular nitrogen.

Following injection of the modified atmosphere 44 into the floral grouping retaining space 20 of the modified atmosphere package 10, the small opening 42 in the first end 14 of the modified atmosphere package 10 is sealed via the bonding material 36 present on the sheet of material 30 from which the modified atmosphere package 10 is constructed, thereby sealing both the floral grouping 12 and the modified atmosphere 44 within the modified atmosphere package 10.

The term "floral grouping" may be used interchangeably herein with the terms "plant" and/or "flower". The term "floral grouping" may also be used interchangeably herein with the terms "botanical item" and/or "propagule". The floral grouping 12 may be cut flowers, a potted plant, or propagules.

The term "botanical item" when used herein means a natural herbaceous or woody plant, taken singly or in combination. The term "botanical item" also means any portion or portions of natural herbaceous or woody plants including stems, leaves, flowers, blossoms, buds, blooms, cones, or roots, taken singly or in combination, or in groupings of such portions such as a bouquet or floral grouping.

The term "propagule" when used herein means any structure capable of being propagated or acting as an agent of reproduction including seeds, shoots, stems, runners, tubers, plants, leaves, roots or spores.

Wherein the floral grouping 12 is a potted plant, the term "floral grouping" includes not only the potted plant but also a pot or container, as well as growing medium. Several advantages to storing potted plants in modified atmosphere storage include, but not by way of limitation, much longer storage times than cut flowers, survival with no need for watering, and prevention of subjection to potentially harmful environments, such as an environment containing ethylene.

A modified atmosphere package 50 may be formed from a preformed container 51, such as a flower pot cover which is adapted to receive a floral grouping 12a wherein the floral grouping 12a is a potted plant, and is capable of being sealed to create an air tight seal at the top of the flower pot cover, as shown in FIGS. 3 and 4. The modified atmosphere package 50 has an open first end 52, a closed second end 54, and a sidewall 56. The closed second end 54 and the sidewall 56 cooperate to define a floral grouping retaining space 58 which openly communicates with the open first end 52 of the modified atmosphere package 50. The material from which the modified atmosphere package 50 is constructed (i.e., a flower pot cover) will have modified atmosphere characteristics such that the material is permeable to certain gases while impermeable to other gases. A bonding material 60 is provided on an inner surface 62 of the modified atmosphere package 50 for reasons which are described in detail above. Fluid impermeable perforations 64 may also be provided on a portion of the modified atmosphere package 50 to assist in removal of the floral grouping 12a.

At least one floral grouping maintenance agent 66 may be disposed in the floral grouping retaining space 58 of the modified atmosphere package 50 with the floral grouping 12a, as shown in FIG. 3. The floral grouping maintenance agent 66 maintains the appearance of the floral grouping 12a until ready for sale by methods such as, but not by way of limitation, preventing disease, wilting, and senescence of the floral grouping 12a, controlling relative humidity and carbon dioxide levels, and holding the floral grouping 12a in such a position as to prevent harmful interactions of individual flowers in the floral grouping 12a with other flowers of the floral grouping 12a or the modified atmosphere package 50. The floral grouping maintenance agent 66 may be a disinfectant, an anti-ethylene agent, an anti-static agent, a water-containing sponge, a carbon dioxide scrubber, a cooling enzyme, a floral holding material and combinations thereof.

The use of a disinfectant, an anti-ethylene agent, and a cooling enzyme as floral grouping maintenance agents 66 will be substantially the same as the use of these agents as surface packaging agents 40 as previously described in detail above, with the exception that the use of the agents as surface packaging agents 40 requires disposing the agent on or incorporating the agent into the sheet of material 30, while the use of the agents as floral grouping maintenance agents 66 simply requires disposing the agent in the modified atmosphere package 50 with the floral grouping 12a.

An anti-static agent may be disposed in the modified atmosphere package 50 with the floral grouping 12a as a floral grouping maintenance agent 66. It will be appreciated that anti-static agents, which prevents multiple floral stems from becoming entangled, are known in the art. It will further be appreciated that the precise amounts of anti-static agents used is dependent upon the results sought and the items to be packaged. The duration of action of the agent will depend, in part, upon the agent(s) used, the concentration of the agent(s) used, and the exposure of the agent(s) to atmospheric and/or packaged conditions.

A water-containing sponge may be disposed in the modified atmosphere package 50 with the floral grouping 12a as a floral grouping maintenance agent 66. It will be appreciated that sponges are known in the art. It will further be appreciated that the precise amounts of sponge or water used is dependent upon the results sought and the items to be packaged. The duration of action of the agent will depend, in part, upon the size of sponge used, the amount of water used, and the exposure of the water-containing sponge to atmospheric and/or packaged conditions.

A carbon dioxide scrubber may be disposed in the modified atmosphere package 50 with the floral grouping 12a as a floral grouping maintenance agent 66. It will be appreciated that carbon dioxide scrubbers, which remove excess carbon dioxide from the modified atmosphere 44a, are known in the art. Examples of carbon dioxide scrubbers include, but not by way of limitation, sodium hydroxide, water, activated charcoal, hydrated lime, a molecular sieve and combinations thereof. It will further be appreciated that the precise amounts of $CO_2$ scrubbers used is dependent upon the results sought and the items to be packaged. The duration of action of the $CO_2$ scrubber will depend, in part, upon the scrubber(s) used, the concentration of the scrubber(s) used, and the exposure of the scrubber(s) to atmospheric and/or packaged conditions.

A floral holding material may be disposed in the modified atmosphere package 50 with the floral grouping 12a as a floral grouping maintenance agent 66. It will be appreciated that floral holding materials are known in the art. Examples of floral holding material include, but not by way of limitation, florist's foam, polymeric holders, fiberboard, netting or sleeves to protect blooms, and tissue paper to protect flowers from condensation. The duration of action of the floral holding material will depend, in part, upon the floral holding material(s) used, the amount of floral holding material(s) used, and the exposure of the floral holding material(s) to atmospheric and/or packaged conditions.

Referring again to FIGS. 4 and 5, after the floral grouping 12a is disposed in the floral grouping retaining space 58 of the package 50, the open first end 52 of the modified atmosphere package 50 is partially closed via the bonding material 60 present on the inner surface 62 of the modified atmosphere package 50. A modified atmosphere 44a is injected into the floral grouping retaining space 58 of the modified atmosphere package 50 through a small opening (not shown) in the partially closed first end 52 of the modified atmosphere package 50. Following injection of the modified atmosphere 44a into the floral grouping retaining space 58 of the modified atmosphere package 50, the small opening (not shown) in the first end 52 of the modified atmosphere package 50 is sealed via the bonding material 60 present on the inner surface 62 of the modified atmosphere package 50, thereby sealing both the floral grouping 12a and the modified atmosphere 44a within the modified atmosphere package 50, as shown in FIG. 4.

Referring now to the modified atmosphere 44, depending upon the particular W floral grouping 12, varying ranges of oxygen, carbon dioxide and nitrogen concentrations may be used in the modified atmosphere 44. The modified atmosphere 44 may contain an oxygen concentration ranging from 0% to about 10% by volume and the remaining concentration of the modified atmosphere 44 being substantially all molecular nitrogen. The modified atmosphere 44 may contain an oxygen concentration ranging from about 1% to about 3% by volume, a carbon dioxide concentration ranging from 0% to about 15% by volume, and the remaining concentration of the modified atmosphere 44 being substantially all molecular nitrogen. Also, the modified atmosphere 44 may contain an oxygen concentration of 21% by

TABLE I

Desired Oxygen and Carbon Dioxide Concentration Ranges for Modified Atmosphere Storage of Specific Flowers

| Floral Grouping | $O_2$ % (By Volume) | $CO_2$ % (By Volume) |
| --- | --- | --- |
| carnations | 0.5–21 | 4–20 |
| roses | 0.5–21 | 5–30 |
| orchids | 1–21 | 0–2 |
| tulips | 3–21 | 0–5 |
| narcissus | 0 | 0.00 |
| daffodils | 0–3 | 0 |
| anthurium | 2–10 | 0 |
| chrysanthemum | 1–2 | 0 |
| mimosa | 7–8 | 0 |
| gladiolus | 1–3 | 5–15 |
| snapdragon | 1–2 | 0–15 |
| lilies | 21 | 10–20 |
| ferns | 21 | 15–30 |
| freesia | 21 | 8–12 | volume, which is the same as normal air, a carbon dioxide concentration ranging from about 8% to about 30% by volume, and the remaining concentration of the modified atmosphere 44 being substantially all molecular nitrogen.

Listed above in Table I are the desired oxygen and carbon dioxide concentration ranges for modified atmosphere packaging for specific cut flowers. For example, but not by way of limitation, the desired oxygen and carbon dioxide concentrations required for modified atmosphere storage of carnations and roses can vary greatly between different cultivars and storage conditions, while the desired modified atmosphere 44 about narcissus will contain substantially all molecular nitrogen. Additionally, the desired modified atmosphere 44 for storing floral groupings such as lilies, ferns and freesia will contain the normal atmospheric oxygen concentration (21%) and a carbon dioxide concentration in the range of from about 8% to about 30% by volume.

It will be understood that other modified atmospheres with differing oxygen and carbon dioxide concentration ranges may be employed in the spirit of the present invention.

Referring now to FIG. 5, a modified atmosphere package 70 is illustrated, which includes an open first end 72, a closed second end 74, and a sidewall 76. The closed second end 74 and the sidewall 76 of the package 70 cooperate to define a floral grouping retaining space 78 which openly communicates with the open first end 72 of the modified atmosphere package 70. Fluid impermeable perforations 79 may be present on a portion of the modified atmosphere package 70. The floral grouping 12b may be cut flowers having a stem portion 80 and a bloom portion 82. The stem portion 80 of the cut flower 12b may be dried prior to being disposed in the modified atmosphere package 70, or the stem portion 80 may be stored wet. Dry storage permits a longer storage period for some flower species and space savings in storage rooms. Dry storage is typically used when maximum storage periods are required.

Wet storage in water or a floral preservative solution is the most common practice for short storage periods.

When dry storage is used, the floral grouping 12b is usually wrapped in soft paper or newspaper to absorb any condensed moisture appearing on the floral grouping 12b prior to disposing the floral grouping 12b in the modified atmosphere package 70.

When wet storage is used, a vial 84 may be provided, as shown in FIG. 5. The vial 84 includes an upper end 86, a closed lower end 88, and a sidewall 90. The vial 84 may be constructed of, but not by way of limitation, plastic or rubber. The closed lower end 88 and the sidewall 90 of the vial 84 cooperate to define a floral stem retaining space 92 openly communicating with the upper end 86 of the vial 84, which is adapted to receive a portion of the stem portion 80 of the cut flower 12b. The vial 84 may or may not be attached to the lower end 74 of the modified atmosphere package 70 via a bonding material 94.

A floral preservative solution 96 is disposed in the floral stem retaining space 92 of the vial 84 prior to placing the stem portion 80 of the cut flower 12b into the floral stem retaining space 92 of the vial 84. The floral preservative solution 96 may contain water, a carbohydrate, a disinfectant, a growth regulator, an ethylene inhibitor, an acidifier, a wetting agent and combinations thereof.

It will be appreciated that carbohydrates are known in the art. Examples of carbohydrates include, but not by way of limitation, sucrose, glucose, fructose and combinations thereof. It will further be appreciated that the precise amounts of carbohydrates used is dependent upon the results sought and the items to be packaged.

The use of a disinfectant in the floral preservative solution 96 will be substantially the same as the use of a disinfectant as a surface packaging agent 40 or a floral grouping maintenance agent 66 as previously described in detail above.

It will be appreciated that growth regulators are known in the art. Examples of growth regulators include, but not by way of limitation, maleic hydrazide, cycloheximide, daminozide, chlormaquat, sodium azide, absicissic acid, n-dimethylamino succinamic acid, cytokinins, auxins, gibberellins, morphactins and combinations thereof. It will further be appreciated that the precise amounts of growth regulators used is dependent upon the results sought and the items to be packaged.

The use of an ethylene inhibitor in the floral preservative solution 96 will be substantially similar to the use of an anti-ethylene agent as a surface packaging agent 40 or a floral grouping maintenance agent 66 as previously described in detail above, with the exception that the term "anti-ethylene agent" as used herein includes agents which remove ethylene from the atmosphere as well as agents which inhibit ethylene production or counteract the effects of ethylene, while the term "ethylene inhibitor" as used herein only includes agents which inhibit ethylene production or counteract the effects of ethylene.

It will be appreciated that acidifiers are known in the art. Examples of acidifiers include, but not by way of limitation, citric acid, isoascorbic acid, tartaric acid, aluminum sulfate and combinations thereof. It will further be appreciated that the precise amounts of acidifiers used is dependent upon the results sought and the items to be packaged.

It will be appreciated that wetting agents are known in the art. Examples of wetting agents include, but not by way of limitation, sodium hypochlorite, TWEEN®-20 and combinations thereof. The precise amount of wetting agent(s) used is dependent upon the results sought and the items to be packaged.

Cut flowers, whether stored wet or dry, may be treated by a grower prior to storage. Treatment methods include, but not by way of limitation, spraying or dipping in disinfectants, pulsing with a floral preservative solution containing carbohydrates, disinfectants, and/or anti-ethylene agents, rapid precooling, and brief exposure to a modified/controlled atmosphere having a substantially high carbon dioxide concentration (over 30%). Typically, the agents used in pretreatment, namely, the disinfectant, the components of the floral preservative solution, and the carbon dioxide concentration of the modified/controlled atmosphere, are much higher than those used in packaging for prolonged storage, i.e., surface packaging agents 40, floral grouping maintenance agents 66, modified atmosphere 44, and floral preservative solution 96. Prolonged exposure to the pretreatment conditions will be very injurious to the floral grouping 12, but brief exposure, from one to 24 hours by growers prior to packaging and transportation will extend shelf life and thus appearance, and assist in subsequent bud opening of certain flowers such as, but not by way of limitation, carnations, roses, chrysanthemum and gladiolus.

It will be understood that the surface packaging agent 40, the floral grouping maintenance agent 66 and the vial 84 containing the floral preservative solution 96 may be employed in any embodiment of the modified atmosphere package as described herein, and are not limited to use with the specific modified atmosphere package 10, 50 or 70 with which they are disclosed or illustrated.

For the sake of brevity, the modified atmosphere storage conditions described hereinafter will only discuss the modified atmosphere package 10 and the floral grouping 12 and modified atmosphere 44 contained therein. However, it will be understood that these conditions will also be observed for the modified atmosphere package 50 and the floral grouping 12*a* and modified atmosphere 44*a* contained therein, as well as the modified atmosphere package 70 and the floral grouping 12*b* and modified atmosphere 44*b* contained therein.

The modified atmosphere package 10 and thus the floral grouping 12 disposed therein will be maintained at a temperature in the range of from about 32 to about 60 degrees Fahrenheit.

During modified atmosphere storage in which air exchange is restricted, the floral grouping 12 will develop an atmosphere containing reduced oxygen and increased carbon dioxide concentrations due to respiration of the floral grouping 12. Hazards associated with using sealed packaging for storage of flowers include accumulation of ethylene, increase of carbon dioxide concentration, or decrease in oxygen concentration, which can have adverse effects on the appearance of the floral grouping 12. Proper precooling of the floral grouping 12 prior to storage and maintenance of the temperature of the modified atmosphere package 10 about the floral grouping 12 in the desired temperature range will inhibit endogenous ethylene production as well as the rate of respiration; however, in addition to the varying oxygen and carbon dioxide permeabilities of the sheet of material 30 from which the modified atmosphere package 10 is constructed, surface packaging agents 40 and/or floral grouping maintenance agents 66, including anti-ethylene agents and carbon dioxide scrubbers, may either be present on the modified atmosphere package 10 or disposed in the floral grouping retaining space 20 of the modified atmosphere package 10 to prevent these hazards from damaging the floral grouping 12.

The modified atmosphere package 10 will be of the size and appearance which can be displayed by a retail florist and will not be opened until ready for sale, and will prevent handling at wholesale and distribution points. By packaging floral groupings singularly or in small groups, different modified atmospheres 44 with specific $O_2$ and $CO_2$ concentrations can be used. This will allow for less handling of the floral groupings at wholesale and distribution points and would even allow bypassing of these points for direct delivery to retail outlets, making the modified atmosphere storage more successful and economically feasible.

Upon sale of the floral grouping 12 maintained in the modified atmosphere package 10 to the retail outlet or the consumer, the modified atmosphere package 10 is torn along the perforations 38 to open the modified atmosphere package 10 and remove the floral grouping 12 from the modified atmosphere package 10.

The relative humidity of the modified atmosphere package must be high to prevent transpiration of the floral grouping 12. Increased transpiration results in loss of water by cells of the floral grouping 12, which results in petal wilting of the flowers, and the rate of transpiration is inversely proportional to the relative humidity of the air. The relative humidity of a modified atmosphere package 10 containing cut flowers should be about 90% to about 98%. The relative humidity of a modified atmosphere package 10 containing potted plants should be about 80% to about 90%.

For modified atmosphere packaging, maintaining a high relative humidity in the package 10 is fairly easy, since the atmosphere surrounding the flowers quickly becomes saturated. However, too high a relative humidity causes water condensation on the flowers and the packaging, and interactions between the condensed water and the floral grouping 12 will result in petal damage and spreading of diseases, such as, but not by way of limitation, Botrytis gray mold. Surface packaging agents 40 and floral grouping maintenance agents 66 are included in the modified atmosphere package for the floral grouping to prevent the floral grouping 12 from contacting condensed water.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for providing a modified atmosphere package for a floral grouping to increase the life of the floral grouping, the method comprising the steps of:

providing a floral grouping comprising cut flowers having a bloom portion and a stem portion;

providing a vial having an upper end, a closed lower end and a sidewall, the closed lower end and the sidewall cooperating to define a floral stem retaining space openly communicating with the upper end of the vial which is adapted to receive a portion of the stem portion of the cut flowers of the floral grouping;

placing a floral preservative solution into the floral stem retaining space of the vial;

placing a portion of the stem portion of the cut flowers of the floral grouping into the vial;

providing a package having an open first end, a closed second end and a sidewall, the closed second end and the sidewall cooperating to define a floral grouping retaining space openly communicating with the open first end of the package, the package constructed of a sheet of material having modified atmosphere characteristics such that the package is permeable to certain gases while impermeable to other gases, the package also having a bonding material present on a portion thereof;

disposing the floral grouping and vial in which a portion of the stem portion of the cut flowers of the floral grouping are disposed into the floral grouping retaining space of the package;

injecting a modified atmosphere into the floral grouping retaining space of the package, the modified atmosphere containing an oxygen concentration ranging from 0% to about 21% by volume, a carbon dioxide concentration ranging from 0% to about 30% by volume, and the remaining concentration of the modified atmosphere being substantially molecular nitrogen; and sealing the open first end of the package to provide a modified atmosphere package for the floral grouping.

2. The method of claim 1 wherein in the step of providing a package, the package has fluid impermeable perforations present on a portion thereof.

3. The method of claim 2 further comprising the steps of tearing the modified atmosphere package along the perforations to open the modified atmosphere package and removing the floral grouping from the modified atmosphere package.

4. The method of claim 1 wherein the floral grouping is carnations, and the modified atmosphere contains an oxygen concentration ranging from about 0.5% to about 21% by volume, a carbon dioxide concentration ranging from about 4% to about 20% by volume, and the remaining concentration of the modified atmosphere being substantially all molecular nitrogen.

5. The method of claim 1 wherein the floral grouping is roses, and the modified atmosphere contains an oxygen concentration ranging from about 0.5% to about 21% by volume, a carbon dioxide concentration ranging from about 5% to about 30% by volume, and the remaining concentration of the modified atmosphere being substantially all molecular nitrogen.

6. The method of claim 1 wherein the floral grouping is orchids, and the modified atmosphere contains an oxygen concentration ranging from about 1% to about 21% by volume, a carbon dioxide concentration ranging from 0% to about 2% by volume, and the remaining concentration of the modified atmosphere being substantially all molecular nitrogen.

7. The method of claim 1 wherein the floral grouping is tulips, and the modified atmosphere contains an oxygen concentration ranging from about 3% to about 21% by volume, a carbon dioxide concentration ranging from 0% to about 5% by volume, and the remaining concentration of the modified atmosphere being substantially all molecular nitrogen.

8. The method of claim 1 wherein in the step of injecting a modified atmosphere into the floral grouping retaining space of the package, the modified atmosphere contains an oxygen concentration ranging from 0% to about 10% by volume and the remaining concentration of the modified atmosphere being substantially all molecular nitrogen.

9. The method of claim 8 wherein the floral grouping is narcissus, and the modified atmosphere contains 100% molecular nitrogen.

10. The method of claim 8 wherein the floral grouping is daffodils, and the modified atmosphere contains an oxygen concentration ranging from 0% to about 3% by volume.

11. The method of claim 8 wherein the floral grouping is anthurium, and the modified atmosphere contains an oxygen concentration ranging from about 2% to about 10% by volume.

12. The method of claim 8 wherein the floral grouping is chrysanthemum, and the modified atmosphere contains an oxygen concentration ranging from about 1% to about 2% by volume.

13. The method of claim 8 wherein the floral grouping is mimosa, and the modified atmosphere contains an oxygen concentration ranging from about 7% to about 8% by volume.

14. The method of claim 1 wherein in the step of injecting a modified atmosphere into the floral grouping retaining space of the package, the modified atmosphere contains an oxygen concentration ranging from about 1% to about 3% by volume, a carbon dioxide concentration ranging from 0% to about 15% by volume, and the remaining concentration of the modified atmosphere being substantially all molecular nitrogen.

15. The method of claim 14 wherein the floral grouping is gladiolus, and the modified atmosphere contains an oxygen concentration ranging from about 1% to about 3% by volume and a carbon dioxide concentration ranging from about 5% to about 15% by volume.

16. The method of claim 14 wherein the floral grouping is snapdragon, and the modified atmosphere contains an oxygen concentration ranging from about 1% to about 2% by volume and a carbon dioxide concentration ranging from 0% to about 15% by volume.

17. The method of claim 1 wherein in the step of injecting a modified atmosphere into the floral grouping retaining space of the package, the modified atmosphere contains an oxygen concentration of about 21% by volume, a carbon dioxide concentration ranging from about 8% to about 30% by volume, and the remaining concentration of the modified atmosphere being substantially all molecular nitrogen.

18. The method of claim 17 wherein the floral grouping is lilies, and the modified atmosphere contains a carbon dioxide concentration ranging from about 10% to about 20% by volume.

19. The method of claim 17 wherein the floral grouping is freesia, and the modified atmosphere contains a carbon dioxide concentration ranging from about 8% to about 12% by volume.

20. The method of claim 1 further comprising the step of disposing at least one floral grouping maintenance agent into the package with the floral grouping prior to sealing the first end of the package, the floral grouping maintenance agent being selected from the group consisting of a disinfectant, an anti-ethylene agent, an anti-static agent, a water-containing sponge, a cooling enzyme, a carbon dioxide scrubber, a floral holding material and combinations thereof.

21. The method of claim 20 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

22. The method of claim 20 wherein the anti-ethylene agent is selected from the group consisting of a potassium permanganate-containing ethylene scrubber, activated brominated charcoal, ethylene oxide, aminoethoxyvinylglycine, sodium thiosulfate, sodium benzoate, carbonyl cyanide, cycloheximide, 1-methylcyclopropene, a substituted benzothiadiazole, a gibberellin, a cytokinin, and combinations thereof.

23. The method of claim 20 wherein the carbon dioxide scrubber is selected from the group consisting of sodium hydroxide, water, activated charcoal, hydrated lime, a molecular sieve and combinations thereof.

24. The method of claim 1 wherein the modified atmosphere and the floral grouping present in the modified atmosphere package are maintained at a temperature in the range of from about 32 to 60 degrees Fahrenheit.

25. The method of claim 1 wherein the relative humidity of the modified atmosphere provided in the modified atmosphere package is about 90% to about 98%.

26. The method of claim 1 wherein the floral preservative solution consists of at least one of water, a carbohydrate, a disinfectant, a growth regulator, an ethylene inhibitor, an acidifier, and a wetting agent.

27. The method of claim 26 wherein the carbohydrate is selected from the group consisting of sucrose, glucose, fructose, and combinations thereof.

28. The method of claim 26 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate, and combinations thereof.

29. The method of claim 26 wherein the growth regulator is selected from the group consisting of maleic hydrazide, cycloheximide, daminozide, chlormaquat, sodium azide, absicissic acid, n-dimethylamino succinamic acid, a cytokinin, an auxin, a gibberellin, a morphactin and combinations thereof.

30. The method of claim 26 wherein the ethylene inhibitor is selected from the group consisting of ethylene oxide, aminoethoxyvinylglycine, sodium benzoate, 1-methylcyclopropene, a substituted benzothiadiazole, a gibberellin, a cytokinin and combinations thereof.

31. The method of claim 26 wherein the acidifier is selected from the group consisting of citric acid, isoascorbic acid, tartaric acid, benzoic acid, aluminum sulfate and combinations thereof.

32. A method for providing a modified atmosphere package for a floral grouping to increase the life of the floral grouping, the method comprising the steps of:
providing a floral grouping comprising cut flowers having a bloom portion and a stem portion;
providing a vial having an upper end, a closed lower end and a sidewall, the closed lower end and the sidewall cooperating to define a floral stem retaining space openly communicating with the upper end of the vial which is adapted to receive a portion of the stem portion of the cut flowers of the floral grouping;
placing a floral preservative solution into the floral stem retaining space of the vial;
placing a portion of the stem portion of the cut flowers of the flower grouping into the vial;
providing a package having an open first end, a closed second end and a sidewall, the closed second end and the sidewall cooperating to define a floral grouping retaining space openly communicating with the open first end of the package, the package constructed of a sheet of material having modified atmosphere characteristics such that the package is permeable to certain gases while impermeable to other gases, the sheet of material having at least one surface packaging agent present on the sheet of material, the package also having a bonding material present on a portion thereof;
disposing the floral grouping and vial in which a portion of the stem portion of the cut flowers of the floral grouping are disposed into the floral grouping retaining space of the package;
injecting a modified atmosphere into the floral grouping retaining space of the package, the modified atmosphere containing an oxygen concentration ranging from 0% to about 21% by volume, a carbon dioxide concentration ranging from 0% to about 30% by volume, and the remaining concentration of the modified atmosphere being substantially molecular nitrogen; and
sealing the open first end of the package to provide a modified atmosphere package for the floral grouping, thereby increasing the life of the floral grouping.

33. The method of claim 32 wherein in the step of providing a package, the package has fluid impermeable perforations on a portion thereof.

34. The method of claim 33 further comprising the steps of tearing the modified atmosphere package along the perforations to open the modified atmosphere package and removing the floral grouping from the modified atmosphere package.

35. The method of claim 32 wherein the floral grouping is carnations, and the modified atmosphere contains an oxygen concentration ranging from about 0.5% to about 21% by volume, a carbon dioxide concentration ranging from about 4% to about 20% by volume, and the remaining concentration of the modified atmosphere being substantially all molecular nitrogen.

36. The method of claim 32 wherein the floral grouping is roses, and the modified atmosphere contains an oxygen concentration ranging from about 0.5% to about 21% by volume, a carbon dioxide concentration ranging from about 5% to about 30% by volume, and the remaining concentration of the modified atmosphere being substantially all molecular nitrogen.

37. The method of claim 32 wherein the floral grouping is orchids, and the modified atmosphere contains an oxygen concentration ranging from about 1% to about 21% by volume, a carbon dioxide concentration ranging from 0% to about 2% by volume, and the remaining concentration of the modified atmosphere being substantially all molecular nitrogen.

38. The method of claim 32 wherein the floral grouping is tulips, and the modified atmosphere contains an oxygen concentration ranging from about 3% to about 21% by volume, a carbon dioxide concentration ranging from 0% to about 5% by volume, and the remaining concentration of the modified atmosphere being substantially all molecular nitrogen.

39. The method of claim 32 wherein in the step of injecting a modified atmosphere into the floral grouping retaining space of the package, the modified atmosphere contains an oxygen concentration ranging from 0% to about 10% by volume and the remaining concentration of the modified atmosphere being substantially all molecular nitrogen.

40. The method of claim 39 wherein the floral grouping is narcissus, and the modified atmosphere contains 100% molecular nitrogen.

41. The method of claim 39 wherein the floral grouping is daffodils, and the modified atmosphere contains an oxygen concentration ranging from 0% to about 3% by volume.

42. The method of claim 39 wherein the floral grouping is anthurium, and the modified atmosphere contains an oxygen concentration ranging from about 2% to about 10% by volume.

43. The method of claim 39 wherein the floral grouping is chrysanthemum, and the modified atmosphere contains an oxygen concentration ranging from about 1% to about 2% by volume.

44. The method of claim 39 wherein the floral grouping is mimosa, and the modified atmosphere contains an oxygen concentration ranging from about 7% to about 8% by volume.

45. The method of claim 32 wherein in the step of injecting a modified atmosphere into the floral grouping retaining space of the package, the modified atmosphere contains an oxygen concentration ranging from about 1% to about 3% by volume, a carbon dioxide concentration ranging from 0% to about 15% by volume, and the remaining concentration of the modified atmosphere being substantially all molecular nitrogen.

46. The method of claim 45 wherein the floral grouping is gladiolus, and the modified atmosphere contains an oxygen concentration ranging from about 1% to about 3% by volume and a carbon dioxide concentration ranging from about 5% to about 15% by volume.

47. The method of claim 45 wherein the floral grouping is snapdragon, and the modified atmosphere contains an oxygen concentration ranging from about 1% to about 2% by volume and a carbon dioxide concentration ranging from 0% to about 15% by volume.

48. The method of claim 32 wherein in the step of injecting a modified atmosphere into the floral grouping retaining space of the package, the modified atmosphere contains an oxygen concentration of about 21% by volume, a carbon dioxide concentration ranging from about 8% to about 30% by volume, and the remaining concentration of the modified atmosphere being substantially all molecular nitrogen.

49. The method of claim 48 wherein the floral grouping is lilies, and the modified atmosphere contains a carbon dioxide concentration ranging from about 10% to about 20% by volume.

50. The method of claim 48 wherein the floral grouping is freesia, and the modified atmosphere contains a carbon dioxide concentration ranging from about 8% to about 12% by volume.

51. The method of claim 32 wherein the surface packaging agent is selected from the group consisting of a disinfectant, a desiccant, an anti-fogging agent, an anti-ethylene agent, a cooling enzyme and combinations thereof.

52. The method of claim 51 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

53. The method of claim 51 wherein the desiccant is selected from the group consisting of calcium chloride, silica gel and combinations thereof.

54. The method of claim 51 wherein the anti-ethylene agent is selected from the group consisting of a potassium permanganate-containing ethylene scrubber, activated brominated charcoal, ethylene oxide, aminoethoxyvinylglycine, sodium thiosulfate, sodium benzoate, carbonyl cyanide, cycloheximide, 1-methylcyclopropene, a substituted benzothiadiazole, a gibberellin, a cytokinin and combinations thereof.

55. The method of claim 32 wherein the modified atmosphere package and thus the floral grouping disposed therein are maintained at a temperature in the range of from about 32 to 60 degrees Fahrenheit.

56. The method of claim 32 wherein the relative humidity of the modified atmosphere within the modified atmosphere package is about 90% to about 98%.

57. The method of claim 32 wherein the floral preservative solution consists of at least one of water, a carbohydrate, a disinfectant, a growth regulator, an ethylene inhibitor, an acidifier, and a wetting agent.

58. The method of claim 57 wherein the carbohydrate is selected from the group consisting of sucrose, glucose, fructose and combinations thereof.

59. The method of claim 57 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

60. The method of claim 57 wherein the growth regulator is selected from the group consisting of maleic hydrazide, cycloheximide, daminozide, chlormaquat, sodium azide, a cytokinin, an auxin, a gibberellin, absicissic acid, n-dimethylamino succinamic acid, a morphactin and combinations thereof.

61. The method of claim 57 wherein the ethylene inhibitor is selected from the group consisting of ethylene oxide, aminoethoxyvinylglycine, sodium benzoate, 1-methylcyclopropene, a substituted benzothiadiazole, a gibberellin, a cytokinin and combinations thereof.

62. The method of claim 57 wherein the acidifier is selected from the group consisting of citric acid, isoascorbic acid, tartaric acid, benzoic acid, aluminum sulfate and combinations thereof.

63. A method for providing a modified atmosphere package for a floral grouping to increase the life of the floral grouping, the method comprising the steps of:

providing a floral grouping comprising cut flowers having a bloom portion and a stem portion;

providing a vial having an upper end, a closed lower end and a sidewall, the closed lower end and the sidewall cooperating to define a floral stem retaining space openly communicating with the upper end of the vial which is adapted to receive a portion of the stem portion of the cut flowers of the floral grouping;

placing a floral preservative solution into the floral stem retaining space of the vial;

placing a portion of the stem portion of the cut flowers of the floral grouping into the vial;

providing a package having an open first end, a closed second end and a sidewall, the closed second end and the sidewall cooperating to define a floral grouping retaining space openly communicating with the open first end of the package, the package constructed of a sheet of material having modified atmosphere characteristics such that the package is permeable to certain gases while impermeable to other gases, the sheet of material having at least one surface packaging agent present on the sheet of material, the package also having a bonding material present on a portion thereof;

disposing the floral grouping and vial in which a portion of the stem portion of the cut flowers of the floral grouping are disposed into the floral grouping retaining space of the package;

disposing within the package at least one floral grouping maintenance agent;

injecting a modified atmosphere into the floral grouping retaining space of the package, the modified atmosphere comprising an oxygen concentration ranging from 0% to about 21% by volume, a carbon dioxide concentration ranging from 0% to about 30% by volume, and the remaining concentration of the modified atmosphere being substantially all molecular nitrogen; and sealing the first end of the package so as to provide a modified atmosphere package for the floral grouping, thereby increasing the life of the floral grouping.

64. The method of claim 63 wherein in the step of providing a package, the package has fluid impermeable perforations present on a portion thereof.

65. The method of claim 64 further comprising the steps of tearing the modified atmosphere package along the perforations to open the modified atmosphere package and removing the floral grouping from the modified atmosphere package.

66. The method of claim 63 wherein the floral grouping is carnations, and the modified atmosphere contains an oxygen concentration ranging from about 0.5% to about 21% by volume, a carbon dioxide concentration ranging from about 4% to about 20% by volume, and the remaining concentration of the modified atmosphere being substantially all molecular nitrogen.

67. The method of claim 63 wherein the floral grouping is roses, and the modified atmosphere contains an oxygen concentration ranging from about 0.5% to about 21% by volume, a carbon dioxide concentration ranging from about 5% to about 30% by volume, and the remaining concentration of the modified atmosphere being substantially all molecular nitrogen.

68. The method of claim 63 wherein the floral grouping is orchids, and the modified atmosphere contains an oxygen concentration ranging from about 1% to about 21% by volume, a carbon dioxide concentration ranging from 0% to about 2% by volume, and the remaining concentration of the modified atmosphere being substantially all molecular nitrogen.

69. The method of claim 63 wherein the floral grouping is tulips, and the modified atmosphere contains an oxygen concentration ranging from about 3% to about 21% by volume, a carbon dioxide concentration ranging from 0% to about 5% by volume, and the remaining concentration of the modified atmosphere being substantially all molecular nitrogen.

70. The method of claim 63 wherein in the step of injecting a modified atmosphere into the floral grouping retaining space of the package, the modified atmosphere contains an oxygen concentration ranging from 0% to about 10% by volume and the remaining concentration of the modified atmosphere being substantially all molecular nitrogen.

71. The method of claim 70 wherein the floral grouping is narcissus, and the modified atmosphere contains 100% molecular nitrogen.

72. The method of claim 70 wherein the floral grouping is daffodils, and the modified atmosphere contains an oxygen concentration ranging from 0% to about 3% by volume.

73. The method of claim 70 wherein the floral grouping is anthurium, and the modified atmosphere contains an oxygen concentration ranging from about 2% to about 10% by volume.

74. The method of claim 70 wherein the floral grouping is chrysanthemum, and the modified atmosphere contains an oxygen concentration ranging from about 1% to about 2% by volume.

75. The method of claim 70 wherein the floral grouping is mimosa, and the modified atmosphere contains an oxygen concentration ranging from about 7% to about 8% by volume.

76. The method of claim 63 wherein in the step of injecting a modified atmosphere into the floral grouping retaining space of the package, the modified atmosphere contains an oxygen concentration ranging from about 1% to about 3% by volume, a carbon dioxide concentration ranging from 0% to about 15% by volume, and the remaining concentration of the modified atmosphere being substantially all molecular nitrogen.

77. The method of claim 76 wherein the floral grouping is gladiolus, and the modified atmosphere contains an oxygen concentration ranging from about 1% to about 3% by volume and a carbon dioxide concentration ranging from about 5% to about 15% by volume.

78. The method of claim 76 wherein the floral grouping is snapdragon, and the modified atmosphere contains an oxygen concentration ranging from about 1% to about 2% by volume and a carbon dioxide concentration ranging from 0% to about 15% by volume.

79. The method of claim 63 wherein in the step of injecting a modified atmosphere into the floral grouping retaining space of the package, the modified atmosphere contains an oxygen concentration of about 21% by volume, a carbon dioxide concentration ranging from about 8% to about 30% by volume, and the remaining concentration of the modified atmosphere being substantially all molecular nitrogen.

80. The method of claim 79 wherein the floral grouping is lilies, and the modified atmosphere contains a carbon dioxide concentration ranging from about 10% to about 20% by volume.

81. The method of claim 79 wherein the floral grouping is freesia, and the modified atmosphere contains a carbon dioxide concentration ranging from about 8% to about 12% by volume.

82. The method of claim 63 wherein the surface packaging agent is selected from the group consisting of a disinfectant, a desiccant, an anti-fogging agent, an anti-ethylene agent, a cooling enzyme and combinations thereof.

83. The method of claim 82 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

84. The method of claim 82 wherein the desiccant is selected from the group consisting of calcium chloride, silica gel and combinations thereof.

85. The method of claim 82 wherein the anti-ethylene agent is selected from the group consisting of a potassium permanganate-containing ethylene scrubber, activated brominated charcoal, ethylene oxide, aminoethoxyvinylglycine, sodium thiosulfate, sodium benzoate, carbonyl cyanide, cycloheximide, 1-methylcyclopropene, a substituted benzothiadiazole, a gibberellin, a cytokinin and combinations thereof.

86. The method of claim 63 wherein the floral grouping maintenance agent is selected from the group consisting of a disinfectant, an anti-ethylene agent, an anti-static agent, a water-containing sponge, a carbon dioxide scrubber, a cooling enzyme and combinations thereof.

87. The method of claim 86 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

88. The method of claim 86 wherein the anti-ethylene agent is selected from the group consisting of a potassium permanganate-containing ethylene scrubber, activated brominated charcoal, ethylene oxide, aminoethoxyvinylglycine, sodium thiosulfate, sodium benzoate, carbonyl cyanide, cyclohexmide, 1-methylcyclopropene, a substituted benzothiadiazole, a gibberellin, a cytokinin and combinations thereof.

89. The method of claim 86 wherein the carbon dioxide scrubber is selected from the group consisting of sodium hydroxide, water, activated charcoal, hydrated lime, a molecular sieve and combinations thereof.

90. The method of claim 63 wherein the modified atmosphere package and thus the floral grouping disposed therein are maintained at a temperature in the range of from about 32 to 60 degrees Fahrenheit.

91. The method of claim 63 wherein the relative humidity of the modified atmosphere provided in the modified atmosphere package is about 90% to about 98%.

92. The method of claim 63 wherein the floral preservative solution consists of at least one of water, a carbohydrate, a disinfectant, a growth regulator, an ethylene inhibitor, an acidifier, and a wetting agent.

93. The method of claim 92 wherein the carbohydrate is selected from the group consisting of sucrose, glucose, fructose and combinations thereof.

94. The method of claim 92 wherein the disinfectant is selected from the group consisting of 8-hydroxyquinoline sulfate, 8-hydroxyquinoline citrate, iprodione, procymidone, vinclozolin, prochloraz, amphyl, sodium hypochlorite, copper sulfate, silver nitrate, silver thiosulfate, thiobendazole, zinc acetate, chlorpyrifos, methyl bromide, aluminum sulfate, aluminum nitrate and combinations thereof.

95. The method of claim 92 wherein the growth regulator is selected from the group consisting of maleic hydrazide, cycloheximide, daminozide, chlormaquat, sodium azide, absicissic acid, n-dimethylamino succinamic acid, a cytokinin, an auxin, a gibberellin, a morphactin and combinations thereof.

96. The method of claim 92 wherein the ethylene inhibitor is selected from the group consisting of ethylene oxide, aminoethoxyvinylglycine, sodium benzoate, 1-methylcyclopropene, a substituted benzothiadiazole, a gibberellin, a cytokinin and combinations thereof.

97. The method of claim 92 wherein the acidifier is selected from the group consisting of citric acid, isoascorbic acid, tartaric acid, benzoic acid, aluminum sulfate and combinations thereof.

\* \* \* \* \*

UNITED STATES PATENT AND TRADEMARK OFFICE
CERTIFICATE OF CORRECTION

PATENT NO.       : 6,460,316 B1
APPLICATION NO.  : 09/908535
DATED            : October 8, 2002
INVENTOR(S)      : Donald E. Weder It is certified that error appears in the above-identified patent and that said Letters Patent is hereby corrected as shown below:

First Page: under the heading, OTHER PUBLICATIONS: The line that begins with "Vegetables", after the word "Flowers." and before the word "and" change "*Inducstrial" to –*Industrial–.

Column 10, line 61: After the word "particular" and before the work "floral" delete the letter "W".

Signed and Sealed this

Twenty-ninth Day of August, 2006

JON W. DUDAS
*Director of the United States Patent and Trademark Office*